(12) United States Patent
Tanji (10) Patent No.: US 9,495,123 B2
(45) Date of Patent: Nov. 15, 2016

(54) IMAGE FORMING APPARATUS INCLUDING SHORT-DISTANCE WIRELESS COMMUNICATION UNIT, METHOD OF CONTROLLING THE SAME, AND STORAGE MEDIUM

(71) Applicant: CANON KABUSHIKI KAISHA, Tokyo (JP)

(72) Inventor: Masamichi Tanji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/822,010

(22) Filed: Aug. 10, 2015

(65) Prior Publication Data
US 2016/0054965 A1    Feb. 25, 2016

(30) Foreign Application Priority Data

Aug. 21, 2014    (JP) ................. 2014-168364

(51) Int. Cl.
| | |
|---|---|
| *G06F 3/12* | (2006.01) |
| *H04N 1/00* | (2006.01) |
| *H04W 4/00* | (2009.01) |
| *H04N 1/327* | (2006.01) |

(52) U.S. Cl.
CPC .......... *G06F 3/1292* (2013.01); *G06F 3/1204* (2013.01); *G06F 3/1236* (2013.01); *H04N 1/00307* (2013.01); *H04N 1/00474* (2013.01); *H04N 1/32704* (2013.01); *H04N 1/32708* (2013.01); *H04W 4/008* (2013.01)

(58) Field of Classification Search
USPC ......................................................... 358/1.13
See application file for complete search history.

(56) References Cited

U.S. PATENT DOCUMENTS

| | | | |
|---|---|---|---|
| 2009/0036056 A1* | 2/2009 | Oshima ............... | H04M 1/7253 455/41.3 |
| 2009/0103124 A1* | 4/2009 | Kimura ................. | G06F 3/1204 358/1.15 |
| 2013/0229690 A1 | 9/2013 | Sumita et al. | |
| 2014/0176991 A1* | 6/2014 | Yun ....................... | H04W 64/00 358/1.15 |

FOREIGN PATENT DOCUMENTS

JP    2013184296 A    9/2013

* cited by examiner

*Primary Examiner* — Ngon Nguyen
(74) *Attorney, Agent, or Firm* — Rossi, Kimms & McDowell LLP

(57) ABSTRACT

An image forming apparatus equipped with a plurality of service applications for providing respective services, in a state enabling a selected one of the service applications to be automatically started from a terminal apparatus. An image forming apparatus capable of performing printing includes a NFC unit. An NFC controller generates data to be read out by an external apparatus, according to selection of one of a plurality of applications. The NFC controller writes the generated data into the NFC unit.

8 Claims, 11 Drawing Sheets

IMAGE FORMING APPARATUS INCLUDING SHORT-DISTANCE WIRELESS COMMUNICATION UNIT, METHOD OF CONTROLLING THE SAME, AND STORAGE MEDIUM

BACKGROUND OF THE INVENTION

1. Field of the Invention

The present invention relates to an image forming apparatus, a method of controlling the same, and a storage medium, and more particularly to an image forming apparatus that includes a short-distance wireless communication unit and performs predetermined processing according to an access received by wireless communication, such as NFC (short-distance wireless communication).

2. Description of the Related Art

In recent years, an image forming apparatuses equipped with various wireless communication functions has come into the market. For example, an image forming apparatus equipped with a wireless communication function, such as NFC, wireless LAN, or Bluetooth (registered trademark), is known. There has been proposed a method of easily performing printing from a communication terminal, such as a smartphone, which is similarly equipped with the NFC function, using such an image forming apparatus (see Japanese Patent Laid-Open Publication No. 2013-184296).

In the method described in Japanese Patent Laid-Open Publication No. 2013-184296, when it is detected that a communication terminal is located in an NFC communication area, the image forming apparatus establishes NFC communication, and exchanges information for changing the NFC communication to communication based on a high-speed communication method, such as wireless LAN communication or Bluetooth (registered trademark). Then, the image forming apparatus establishes high-speed communication with the communication terminal based on the exchanged information to thereby receive print data from the communication terminal, and executes printing.

To easily perform printing in this image forming apparatus, it is necessary to set required information in advance in an NFC module installed in the image forming apparatus as NDEF (NFC Data Exchange Format) data.

The NDEF data is formed by a plurality of NDEF records, and each NDEF record stores information, such as device identification information for uniquely identifying the image forming apparatus from the communication terminal, or connection information for performing connection using Bluetooth (registered trademark). Further, the NDEF data and the NDEF records forming the NDEF data have various contents depending on a function realized by the NFC module.

For example, in a case where a predetermined application is desired to be automatically started on the communication terminal side, an NDEF record for calling the corresponding application is stored. Note that details of the format and others of the NDEF data and the NDEF record are defined by the NFC forum which is the standard organization.

Incidentally, there is a case where it is desired to start a different application on the communication terminal side, by using one of a plurality of applications installed in the image forming apparatus using the NFC module. For such a case, there has been proposed, for example, a method of causing the image forming apparatus to generate NDEF data in which an NDEF record for automatically starting an application A is stored as a top record and an NDEF record for automatically starting another application B is stored as a next record.

However, analysis processing performed on the NDEF data depends on the specification and implementation of the communication terminal. Further, the communication terminals include one which does not take into account a case where the NDEF record for automatically starting an application is stored at a location other than the top of the records. In such a communication terminal, only the application A is automatically started, but the application B cannot be automatically started.

SUMMARY OF THE INVENTION

The present invention provides an image forming apparatus equipped with a plurality of applications for providing respective services, in a state enabling a selected one of the applications to be automatically started from a terminal apparatus, a method of controlling the same, and a storage medium.

In a first aspect of the present invention, there is provided an image forming apparatus that is capable of performing printing, comprising a short-distance wireless communication unit, a selection unit configured to select one of a plurality of applications, a generation unit configured to generate data to be read out by an external apparatus, the data corresponding to an application selected by said selection unit, and a writing unit configured to write the data generated by said generation unit, into said short-distance wireless communication unit.

In a second aspect of the present invention, there is provided a method of controlling an image forming apparatus that is capable of performing printing and includes a short-distance wireless communication unit, comprising selecting one of a plurality of applications, generating data to be read out by an external apparatus, the data corresponding to an application selected by said selecting, and writing the data generated by said generating, into the short-distance wireless communication unit.

In a third aspect of the present invention, there is provided a non-transitory computer-readable storage medium storing a computer-executable program for executing a method of controlling an image forming apparatus that is capable of performing printing and includes a short-distance wireless communication unit, wherein the method comprises selecting one of a plurality of applications, generating data to be read out by an external apparatus, the data corresponding to an application selected by said selecting, and writing the data generated by said generating, into the short-distance wireless communication unit.

According to the present invention, according to an application selected from a plurality of applications, data which is to be read by an external apparatus and corresponds to the selected application is generated and stored in a short-distance wireless communication unit. This enables the external apparatus to automatically start the application. As a consequence, even if an external apparatus does not support automatic start of an application for making use of a service, it is possible to properly start an application desired by the user.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
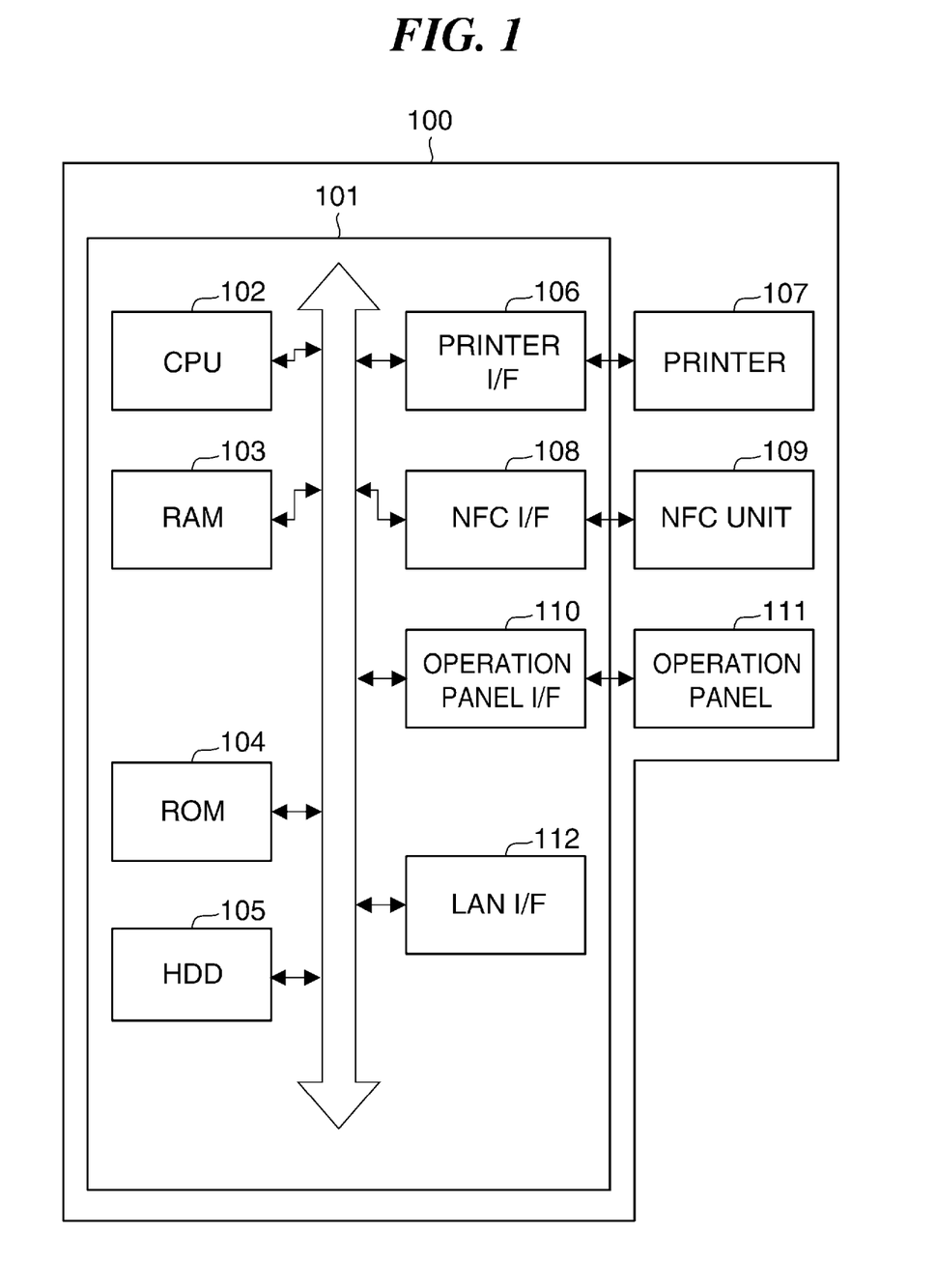
FIG. 1 is a block diagram of an image forming apparatus according to a first embodiment of the present invention.

FIG. 1 is a block diagram of an image forming apparatus 100 according to a first embodiment of the present invention.

The image forming apparatus 100 shown in FIG. 1 is capable of performing NFC communication with a communication terminal, such as a mobile terminal or a PC, described hereinafter. The image forming apparatus 100 includes a controller 101, and the controller 101 is provided with a CPU 102.

The CPU 102 reads out control programs stored in a ROM 104, and performs various control, such as communication control, described hereinafter. A RAM 103 is used as a main memory and a temporary storage area, such as a work area, for operation of the CPU 102. A hard disk drive (HDD) 105 stores image data, various programs, various information tables, and so forth.

A printer interface 106 connects between a printer (printer engine) 107 and the controller 101. The printer 107 performs print processing on a sheet fed from a sheet feed cassette (not shown) based on print data (image data) sent via the printer interface 106.

An NFC interface 108 connects between an NFC unit 109 and the controller 101. The NFC unit 109 holds NDEF data (identification data) sent from the controller 101 via the NFC interface 108. Further, when a communication terminal is located within an NFC communication area, the NFC unit 109 transfers the NDEF data to the communication terminal, denoted by reference numeral 300, by NFC (Near Field Communication). Further, when the NFC unit 109 has transferred the NDEF data to the communication terminal, the NFC unit 109 notifies the controller 101 of this fact via the NFC interface 108.

An operation panel interface 110 connects between an operation panel 111 and the controller 101. The operation panel 111 displays a menu screen and others, described hereinafter.

A LAN interface 112 is used in performing LAN communication with a communication terminal. The CPU 102 receives print data from the communication terminal by LAN communication, and controls the printer 107 to perform print processing based on the received print data. As LAN communication, wired LAN communication or wireless LAN communication is used, for example.

Although in the image forming apparatus 100, one CPU 102 performs processes shown in flowcharts, described hereinafter, using one memory (RAM 103), this is not limitative. For example, a plurality of CPUs and a plurality of memories may be cooperatively operated to perform the processes shown in the flowcharts, described hereinafter.

Figure 2:
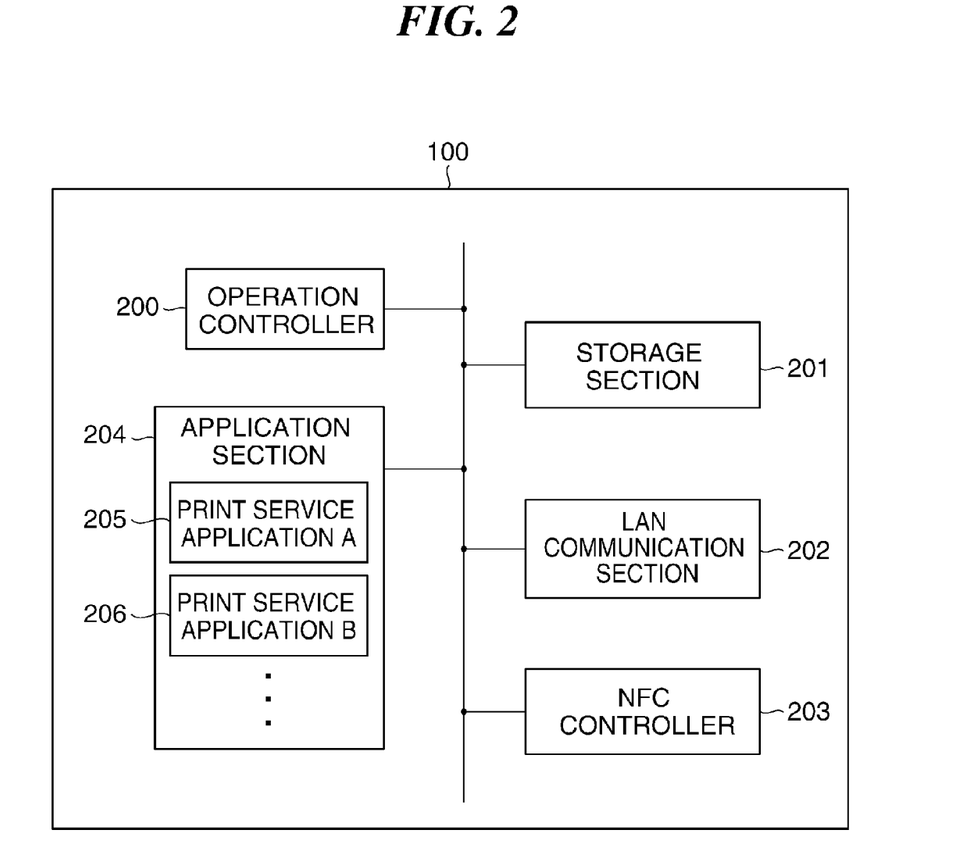
FIG. 2 is a block diagram showing the software configuration of the image forming apparatus shown in FIG. 1.

FIG. 2 is a block diagram showing the software configuration of the image forming apparatus 100 shown in FIG. 1. The function sections, appearing in FIG. 2, are operated by the CPU 102 executing the control programs stored in the ROM 104 or the HDD 105.

An operation controller 200 controls the operation panel 111. For example, the operation controller 200 displays an operation screen on the operation panel 111. Further, the operation controller 200 receives a user's instruction via the operation screen.

Further, the operation controller 200 notifies another function section of the received user's instruction, and updates the operation screen according to the received user's instruction.

A storage section 201 stores designated data in the RAM 103 or the HDD 105 according to an instruction from the other function section, and loads the stored data into the RAM 103 or the HDD 105. A LAN communication section 202 controls LAN communication performed via the LAN interface 112.

An NFC controller 203 controls the NFC unit 109 via the NFC interface 108. An application section 204 is formed by a plurality of service applications. The illustrated example includes at least a print service application A 205 and a print service application B 206, that perform print services by respective different methods from each other.

The print service application A 205 performs communication with an application A 406 on the communication terminal, described hereinafter, e.g. by LAN communication, and receives print data from the application A 406. Then, if the received print data conforms to a protocol format supported by the print service application A 205, the print service application A 205 outputs the print data to the printer 107 via the printer interface 106.

The print service application B 206 performs communication with an application B 407 on the communication terminal, described hereinafter, e.g. by LAN communication, and receives print data from the application B 407. Then, if the received print data conforms to a protocol format supported by the print service application B 206, the print service application B 206 outputs the print data to the printer 107 via the printer interface 106.

Here, the protocol format supported by the print service application A 205 and the protocol format supported by the print service application B 206 are different from each other. For example, the print service application A 205 is a print service using an IPP (Internet Printing Protocol), and the print service application B 206 is a print service using a RAW protocol or a LPR protocol.

Other various service applications may be included in the application section 204.

Figure 3:
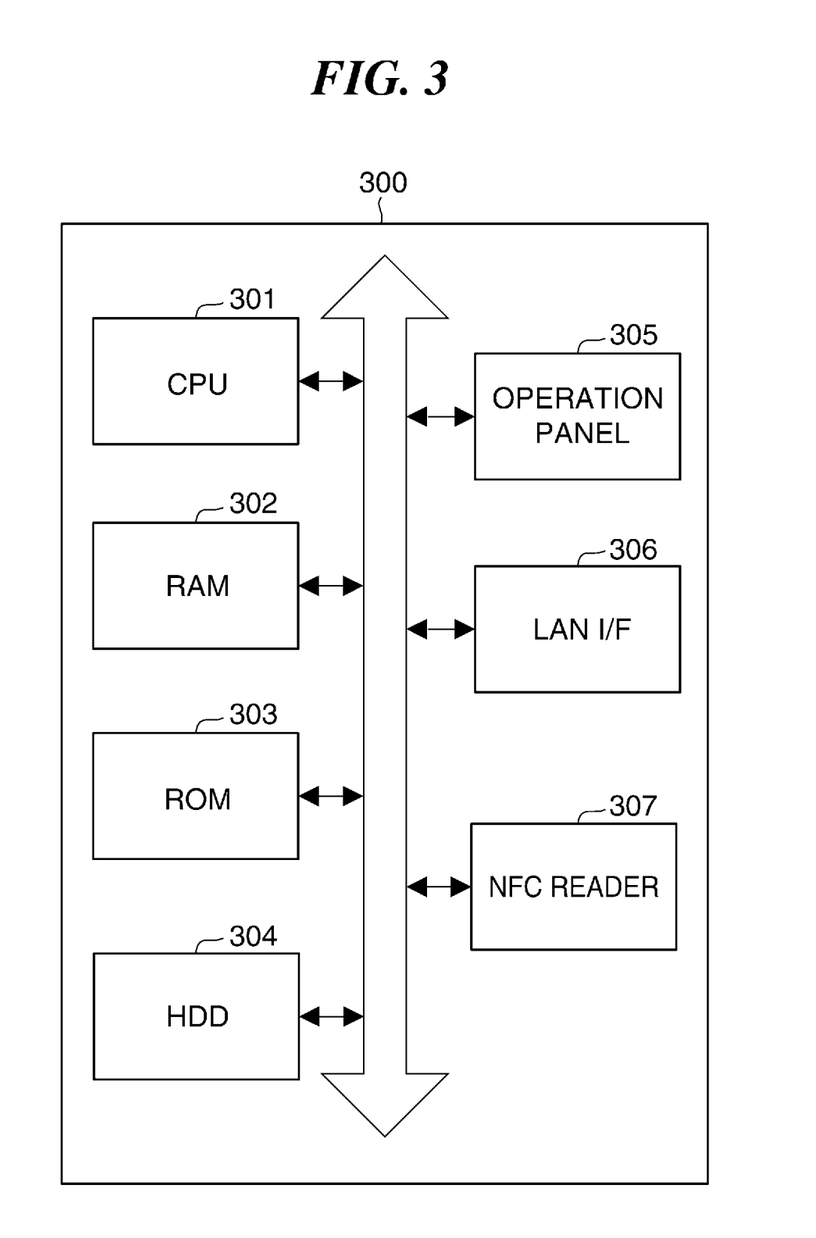
FIG. 3 is a block diagram of a communication terminal that performs communication with the image forming apparatus shown in FIG. 1.

FIG. 3 is a block diagram of the communication terminal 300 that performs communication (wireless communication) with the image forming apparatus 100 shown in FIG. 1.

The communication terminal 300 includes a CPU 301, and the CPU 301 reads out control programs stored in a ROM 303 to thereby control the overall operation of the communication terminal 300. A RAM 302 is used as a main memory and a temporary storage area, such as a work area, for the operation of the CPU 301. An HDD 304 stores data, various programs, various information tables, and so forth.

An operation panel 305 displays various screens, such as an operation screen and a setting screen. The operation panel 305 has a touch panel function, and a user can input various instructions to the communication terminal 300 by a touch operation, a drag operation, a flick operation, and so forth.

A LAN interface 306 is used in performing LAN communication with an external apparatus, such as the image forming apparatus 100. The CPU 301 can transmit e.g. image data stored in a memory, such as the HDD 304, to the image forming apparatus 100 via the LAN interface 306 as print data.

An NFC reader 307 is a unit for reading out NDEF data from the NFC unit 109 equipped in an external apparatus, such as the image forming apparatus 100. Reading of NDEF data is performed when the communication terminal 300 is located within the NFC communication area of the external apparatus, such as the image forming apparatus 100.

In general, the NFC communication area is an area within a distance of approximately several to ten centimeters. Therefore, when a user performs NDEF reading, the user performs an operation of touching an NFC unit equipped in an external apparatus, such as the image forming apparatus 100, with the NFC reader 307 of the communication terminal 300, or an operation of holding the NFC reader 307 of the communication terminal 300 over the NFC unit.

Although in the illustrated communication terminal 300, one CPU 301 performs processes shown in flowcharts, described hereinafter, using one memory (RAM 103), this is not limitative. For example, a plurality of CPUs and a plurality of memories may be cooperatively operated to perform the processes shown in the flowcharts, described hereinafter.

Figure 4:
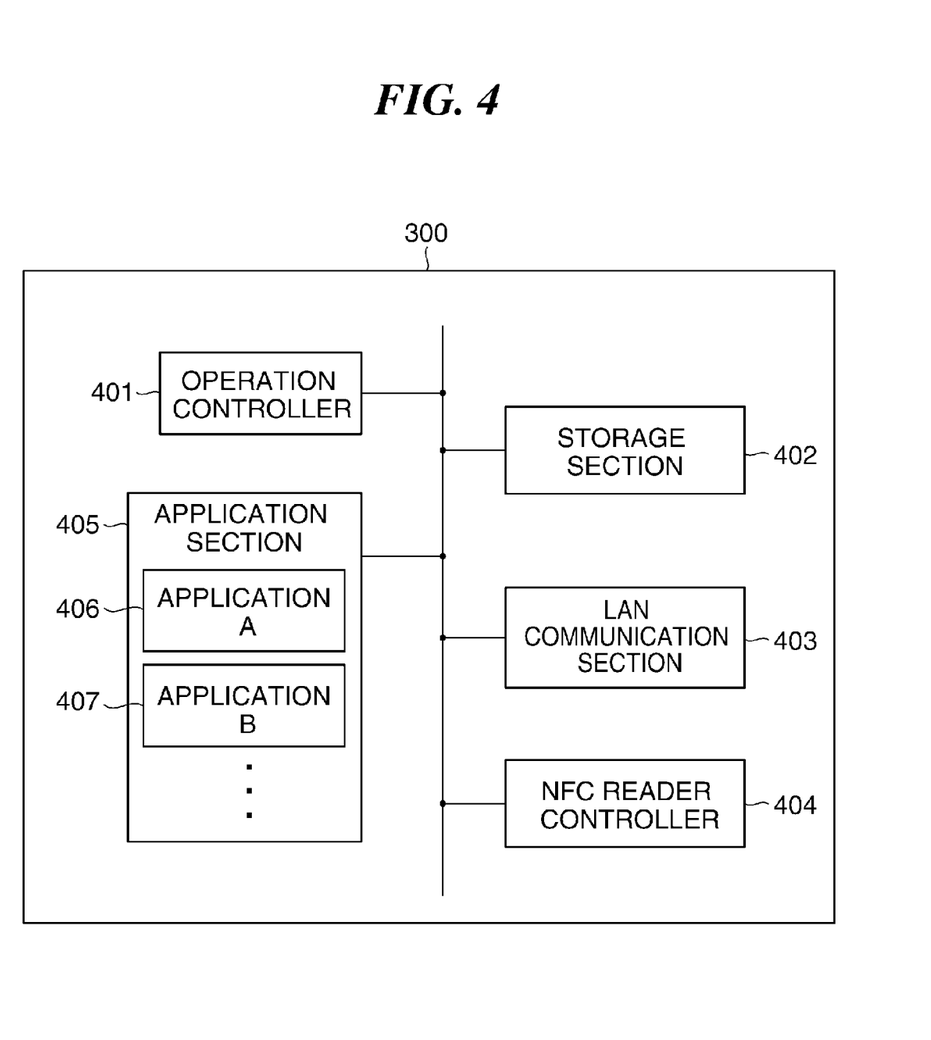
FIG. 4 is a block diagram showing the software configuration of the communication terminal shown in FIG. 3.

FIG. 4 is a block diagram showing the software configuration of the communication terminal 300, shown in FIG. 3.

The function sections, appearing in FIG. 4, are operated by the CPU 301 executing the control programs stored in the ROM 303 or the HDD 304.

An operation controller 401 controls the operation panel 305. For example, the operation controller 401 displays an operation screen on the operation panel 305. Further, the operation controller 401 receives a user's instruction input via the operation screen. Further, the operation controller 401 notifies another function section of the received user's instruction, and updates the operation screen according to the received user's instruction.

A storage section 402 stores designated data in the RAM 302 or the HDD 304 according to an instruction from another function section, and loads the stored data into the RAM 302 or the HDD 304. A LAN communication section 403 controls LAN communication performed via the LAN interface 306.

An NFC reader controller 404 controls the NFC reader 307. An application section 405 is formed by a plurality of applications. The illustrated example includes at least the application A 406 and the application B 407.

The application A 406 is an application that performs communication with the print service application A 205 operating on the image forming apparatus 100 e.g. by LAN communication, and transmits print data using the protocol format supported by the print service application A 205.

Similarly, the application B 407 is an application that performs communication with the print service application B 206 operating on the image forming apparatus 100 e.g. by LAN communication, and transmits print data using the protocol format supported by the print service application B 206.

Other various applications may be included in the application section 405.

Further, the application A 406 and the application B 407 are publicly available from a public server (predetermined server: not shown) or the like, and can be installed in the communication terminal 300 by accessing the public server e.g. via the LAN interface 306. Further, the application A 406 and the application B 407 may be pre-installed in the communication terminal 300.

Figure 5:
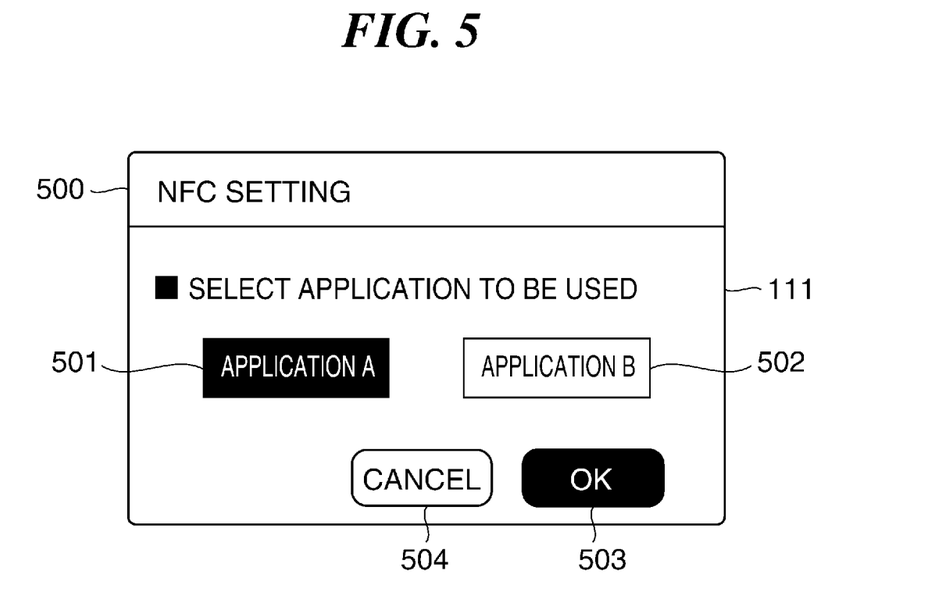
FIG. 5 is a diagram showing an example of an NFC setting screen displayed on an operation panel by an operation controller appearing in FIG. 2.

FIG. 5 is a diagram showing an example of an NFC setting screen 500 displayed on the operation panel 111 by the operation controller 200, appearing in FIG. 2.

The NFC setting screen (selection screen) 500 shown in FIG. 5 is a screen for prompting a user to select the application A 406 or application B 407 of the communication terminal 300, from the image forming apparatus 100. The NFC setting screen 500 displays an application A button 501 and an application B button 502, as well as an OK button 503 and a cancel button 504.

When the user selects the application A button 501 or the application B button 502, and presses the OK button 503 on the NFC setting screen 500, the NFC controller 203 performs an NFC rewriting process, described hereinafter. On the other hand, when the user presses the cancel button 504, the operation controller 200 terminates the display of the NFC setting screen 500.

Figure 6:
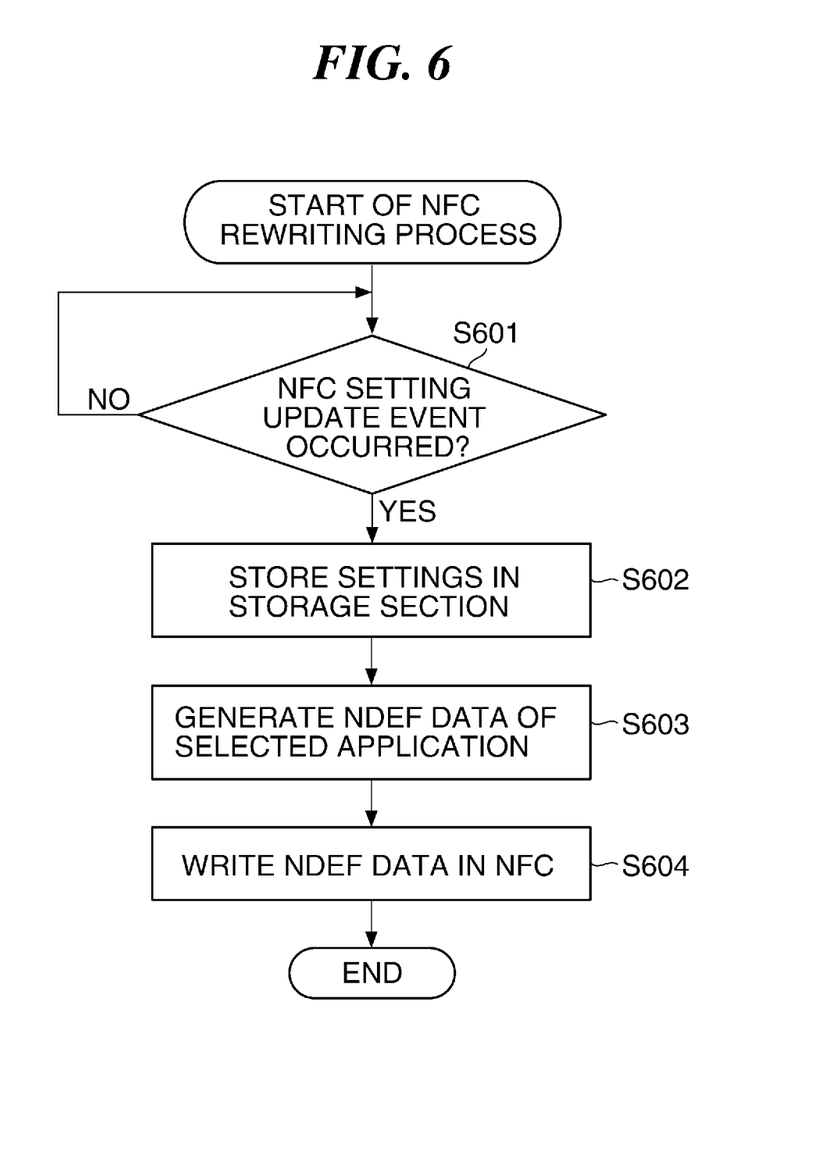
FIG. 6 is a flowchart of an NFC rewriting process performed by the image forming apparatus shown in FIG. 1.

FIG. 6 is a flowchart of the NFC rewriting process performed by the image forming apparatus 100 shown in FIG. 1.

The NFC rewriting process in FIG. 6 is performed by the NFC controller 203 when the user selects an application on the NFC setting screen 500. Further, the NFC rewriting process is performed by the CPU 102 executing a program therefor stored in the RAM 103, the ROM 104, or the HDD 105.

The NFC controller 203 controls the operation controller 200 to determine whether or not the user has selected an application, causing an NFC setting update event to occur (step S601). That is, the NFC controller 203 determines whether or not the user has selected the application A button 501 or the application B button 502, and pressed the OK button 503 on the NFC setting screen 500.

If no NFC setting update event has occurred (NO to the step S601), the NFC controller 203 is on standby. On the other hand, if an NFC setting update event has occurred (YES to the step S601), the NFC controller 203 stores the selection performed on the NFC setting screen 500 (i.e. the selected application) in the storage section 201 (step S602). Then, the NFC controller 203 generates NDEF data to be written into the NFC unit 109 according to the selected application (selected service application) (step S603).

Figure 7:
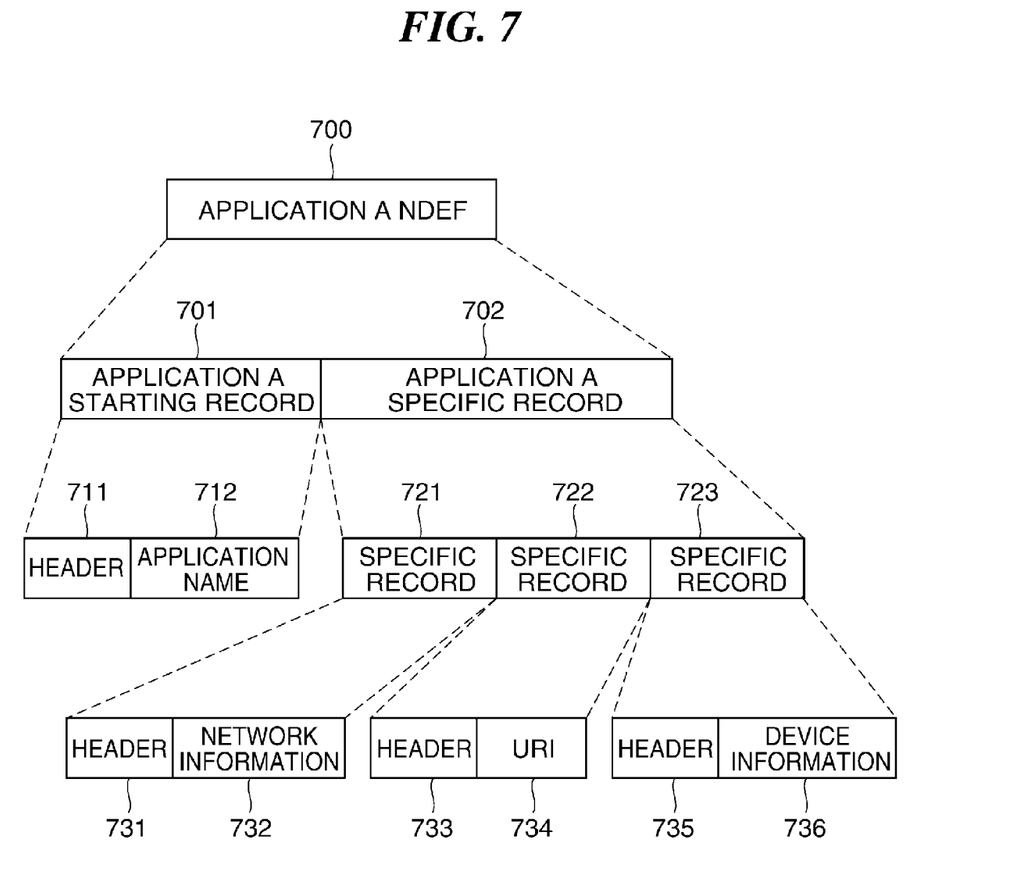
FIG. 7 is a diagram showing an example of NDEF data generated when an application A button appearing in FIG. 5 is pressed.

FIG. 7 is a diagram showing an example of the NDEF data generated when the application A button 501 appearing in FIG. 5 is pressed.

The illustrated NDEF data (hereinafter referred to as the application A NDEF), denoted by reference numeral 700, has at least an application A starting record 701 and an application A specific record 702. The application A starting record 701 is a record for starting the application A 406. The application A specific record 702 is a record storing necessary information used during operation of the application A 406.

More specifically, the application A starting record 701 is a record storing instruction information for causing the communication terminal 300 which has read the record to start the application A 406. For example, the application A starting record 701 has a header 711 storing header information of start information record and an application name 712 storing a package name of the application A 406.

The header 711 stores information in a format defined by the NFC forum, which indicate that the application A starting record 701 is a record which plays a role of starting an application. The application name 712 stores a character string including the name of the application A 406.

The application A specific record 702 has the three records of specific records 721 to 723. The specific record 721 has a header 731 and network information 732, and the header 731 stores information in a format defined by the NFC forum, which indicate that the specific record 721 is a record storing network information.

The network information 732 stores information for enabling the application A 406 to identify the image forming apparatus 100 on the network. The network information 732 stores an IP address, a MAC address, a UUID, and so forth, which have been assigned to the image forming apparatus 100.

The specific record 722 has a header 733 and a URI 734. The header 733 stores information in a format defined by the NFC forum, which indicates that the specific record 722 is a record storing a URI (Uniform Resource Identifier).

The URI 734 stores the URI to be used by the application A 406 for transmitting print data to the print service application A 205 of the image forming apparatus 100.

The specific record 723 has a header 735 and device information 736. The header 735 stores information in a format defined by the NFC forum, which indicates that the specific record 723 is a record storing the device information.

The device information 736 stores the device information of the image forming apparatus 100, which is referred to by the application A 406. The device information 736 stores, for example, a vendor name or a model name, and a product name or the like of the image forming apparatus 100.

The application A specific record 702 may store a record other than the above-mentioned specific records 721 to 723, or may be configured so as to store only part of the above-mentioned specific records 721 to 723.

Further, the application A NDEF 700 may include records other than the application A starting record 701 and the application A specific record 702.

Figure 8:
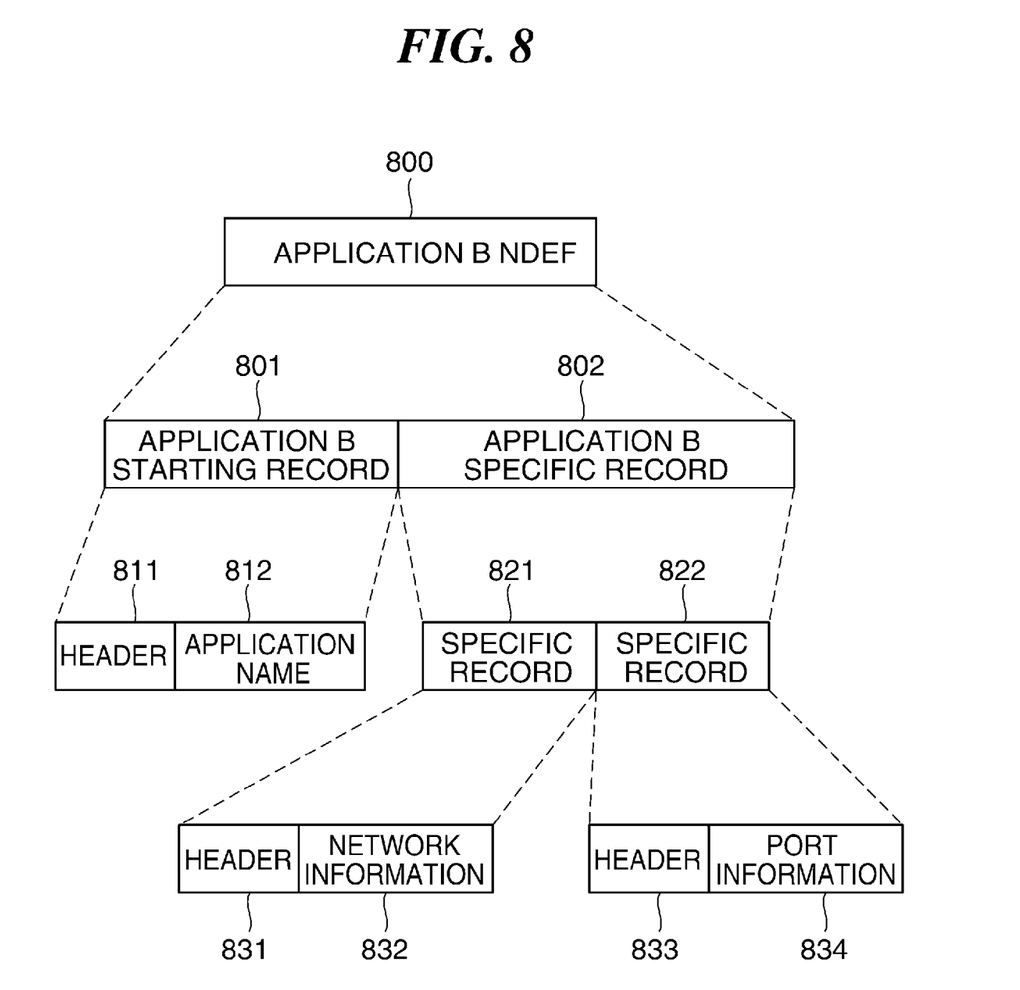
FIG. 8 is a diagram showing an example of NDEF data generated when an application B button appearing in FIG. 5 is pressed.

FIG. 8 is a diagram showing an example of NDEF data generated when the application B button 502 appearing in FIG. 5 is pressed.

The illustrated NDEF data (hereinafter referred to as the application B NDEF), denoted by reference numeral 800, has at least an application B starting record 801 and an application B specific record 802. The application B starting record 801 is a record for starting the application B 407. The application B specific record 802 is a record for storing necessary information used during operation of the application B 407.

That is, the application B starting record 801 is a record storing instruction information for causing the communication terminal 300 which has read the record to start the application B 407. For example, the application B starting record 801 has a header 811 storing header information of start information record and an application name 812 storing a package name of the application B 407.

The header 811 stores information in a format defined by the NFC forum, which indicates that the application B starting record 801 is a record which plays a role of starting an application. The application name 812 stores a character string including the name of the application B 407.

The application B specific record 802 has the two records of specific records 821 and 822. The specific record 821 has a header 831 and network information 832, and the header 831 stores information in a format defined by the NFC forum, which indicates that the specific record 821 is a record storing network information.

The network information 832 stores information for enabling the application B 407 to identify the image forming apparatus 100 on the network. The network information 832 stores an IP address, a MAC address, a UUID, and so forth, which have been assigned to the image forming apparatus 100.

The specific record 822 has a header 833 and port information 834. The header 833 stores information in a format defined by the NFC forum, which indicates that the specific record 822 is a record storing optional information described in a text format.

The port information 834 stores a port number of a port for receiving print data by the print service application B 206, in the text format. The application B 407 can transmit print data to the port of the port number stored in the port information 834 to thereby cause the print service application B 206 to perform printing according to the print data.

The application B specific record 802 may store a record other than the above-mentioned specific records 821 and 822, or may be configured so as to store only part of the above-mentioned specific records 821 and 822.

Further, the application B NDEF 800 may include records other than the application B starting record 801 and the application B specific record 802.

Referring again to FIG. 6, when the application A NDEF 700 or the application B NDEF 800 is generated as described above, the NFC controller 203 writes the generated NDEF data into the NFC unit 109 via the NFC interface 108 (step S604). Then, the NFC controller 203 terminates the NFC rewriting process.

Figure 9:
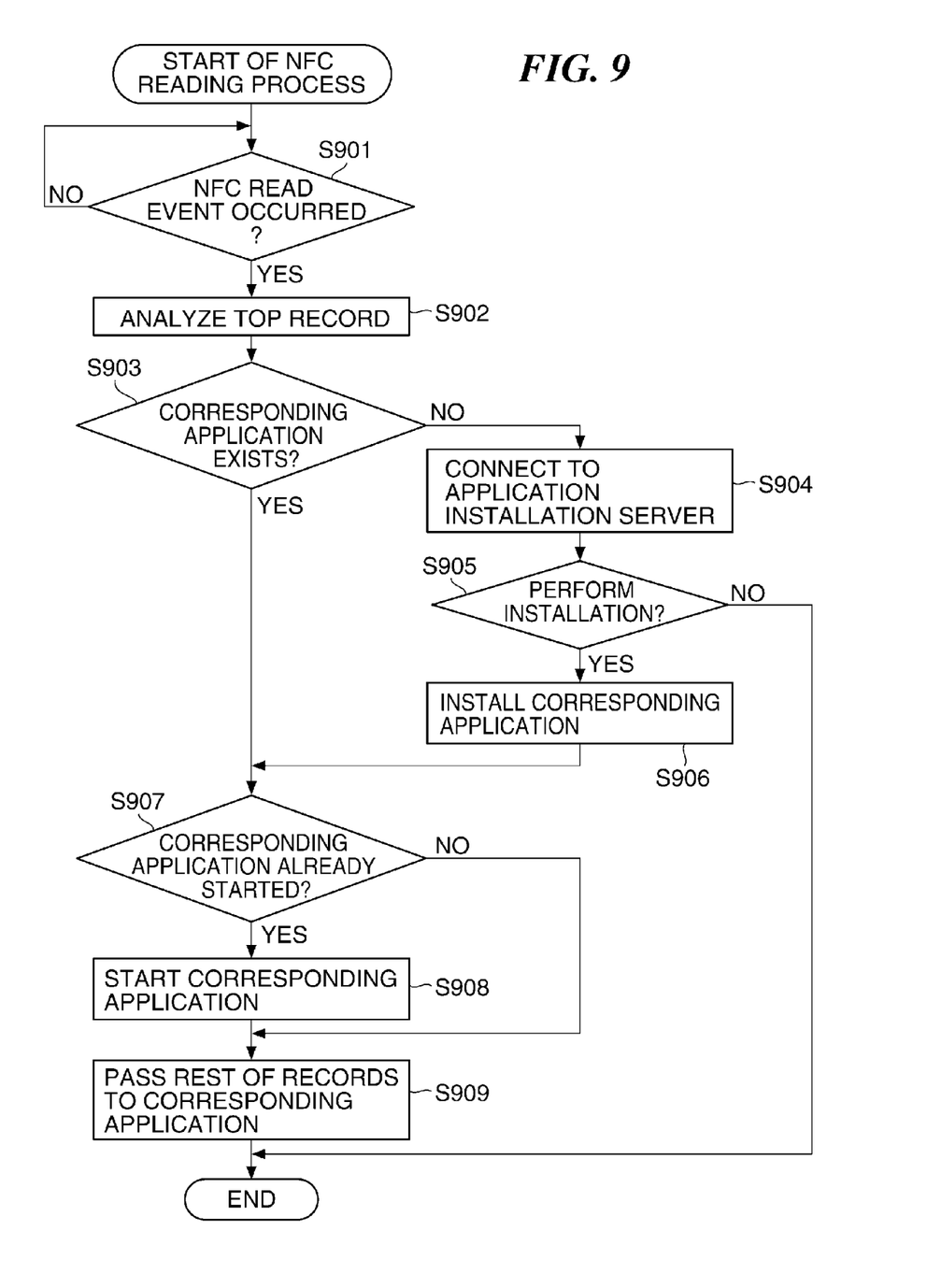
FIG. 9 is a flowchart of an NFC reading process performed by the communication terminal shown in FIG. 3.

FIG. 9 is a flowchart of an NFC reading process performed by the communication terminal 300 shown in FIG. 3.

The NFC reading process in FIG. 9 is performed by the NFC reader controller 404 when the user touches the NFC unit 109 with the NFC reader 307. Further, the NFC reading process is performed by the CPU 301 executing a program therefor stored in the RAM 302, the ROM 303, or the HDD 304.

The NFC reader controller 404 determines whether or not an NDEF data read event (i.e. a transmission request) has occurred (NFC read generation) in the NFC reader 307 (step S901). Note that the NDEF data read event by the NFC reader 307 occurs when the user touches the NFC unit 109 with the NFC reader 307 or holds the NFC reader 307 over the NFC unit 109, whereby the communication terminal 300 is positioned within the NFC communication area of the NFC unit 109.

Here, the application A NDEF 700 or the application B NDEF 800 is read out according to user's selection on the NFC setting screen 500.

If no NDEF data read event has occurred (NO to the step S901), the NFC reader controller 404 is on standby. On the other hand, if an NDEF data read event has occurred (YES to the step S901), the NFC reader controller 404 reads out the selected NDEF data, and analyzes the top record of the NDEF data (step S902).

Here, in a case where the application A NDEF 700 is read out, it has the application A starting record 701 stored as the top record. Further, in a case where the application B NDEF 800 is read out, it has the application B starting record 801 stored as the top record.

Next, the NFC reader controller 404 determines whether or not an application having the same name as the application name stored in the application name 712 or the application name 812 of the top record already exists in the application section 405 (step S903).

If no application having the same name is found (NO to the step S903), the NFC reader controller 404 controls the LAN communication section 403 to connect to the public server from which the application is publicly available, via the LAN interface 306, so as to prompt the user to install the application (step S904).

To connect to the public server, the NFC reader controller 404 performs a connection operation based on the server information held by an application for installation purpose only (not shown) installed in the application section 405 in advance. That is, the NFC reader controller 404 starts the application for installation purpose only, and connects to the public server using this application based on the server information.

Connection to the public server may be performed by causing information for access to the public server to be stored in the application name 712 or the application name 812, and the application for installation purpose only to receive the information for access, from the NFC reader controller 404.

Next, the NFC reader controller 404 controls the operation controller 401 to display a confirmation screen for confirming whether or not to permit execution of the application on the operation panel 305, to thereby prompt the user of the communication terminal 300 to confirm whether or not to install the application (step S905).

If the user selects not to install the application on the confirmation screen (NO to the step S905), the NFC reader controller 404 terminates the NFC reading process. On the other hand, if the user selects to install the application on the confirmation screen (YES to the step S905), the NFC reader controller 404 installs the application in the application section 405 (step S906). Then, the NFC reader controller 404 determines whether or not the application has already been started (step S907).

If an application having the same name is found (YES to the step S903), the NFC reader controller 404 directly proceeds to the step S907.

Incidentally, if the application A starting record 701 has been analyzed in the step S902, the NFC reader controller 404 determines whether or not the application A 406 has been started. Similarly, if the application B starting record 801 has been analyzed in the step S902, the NFC reader controller 404 determines whether or not the application B 407 has been started.

If the application has not been started yet (NO to the step S907), the NFC reader controller 404 starts the application (step S908). Then, the NFC reader controller 404 passes the rest of the records of the NDEF data to the started application (step S909), followed by terminating the NFC reading process.

If the application has been started (YES to the step S907), the NFC reader controller 404 directly proceeds to the step S909.

Note that in a case where the read NDEF data is the application A NDEF 700, the application A specific record 702 is passed to the application A 406. On the other hand, in a case where the read NDEF data is the application B NDEF 800, the application B specific record 802 is passed to the application B 407.

As a consequence, the application A 406 or the application B 407 transmits and receives print data to and from the image forming apparatus 100 according to the contents of the record.

As described above, in the first embodiment of the present invention, the user is enabled to select an application to be used in the image forming apparatus 100 in advance. This makes it possible to start an application desired by the user even on a communication terminal which does not support automatic start concerning a plurality of applications.

Next, a description will be given of an image forming apparatus according to a second embodiment of the present invention. The image forming apparatus according to the second embodiment has the same hardware configuration as that of the image forming apparatus according to the first embodiment, and hence the same component elements are designated by the same reference numerals while omitting the description thereof.

In the above-described first embodiment, there can be a case where a user sometimes performs the NFC touch operation using the communication terminal 300 without selecting an application on the NFC setting screen 500 displayed on the image forming apparatus 100. In this case, neither the application A 406 nor the application B 407 is started on the communication terminal 300, and hence the user cannot perform desired printing.

In this state, although the user has performed the NFC touch operation, no response is obtained, and hence it is difficult for the user to immediately find out the cause. Further, even if the user notices the cause, to cope with this, the user is required to cause the NFC setting screen 500 to be displayed by a manual operation on the operation panel 111 of the image forming apparatus 100, and then select the application, which requires the user to take time and effort.

To solve this problem, in the second embodiment, the image forming apparatus immediately notifies a user of the necessity of selection of the application in the above-mentioned case, and enables the user to select an application by an easy operation.

Figure 10:
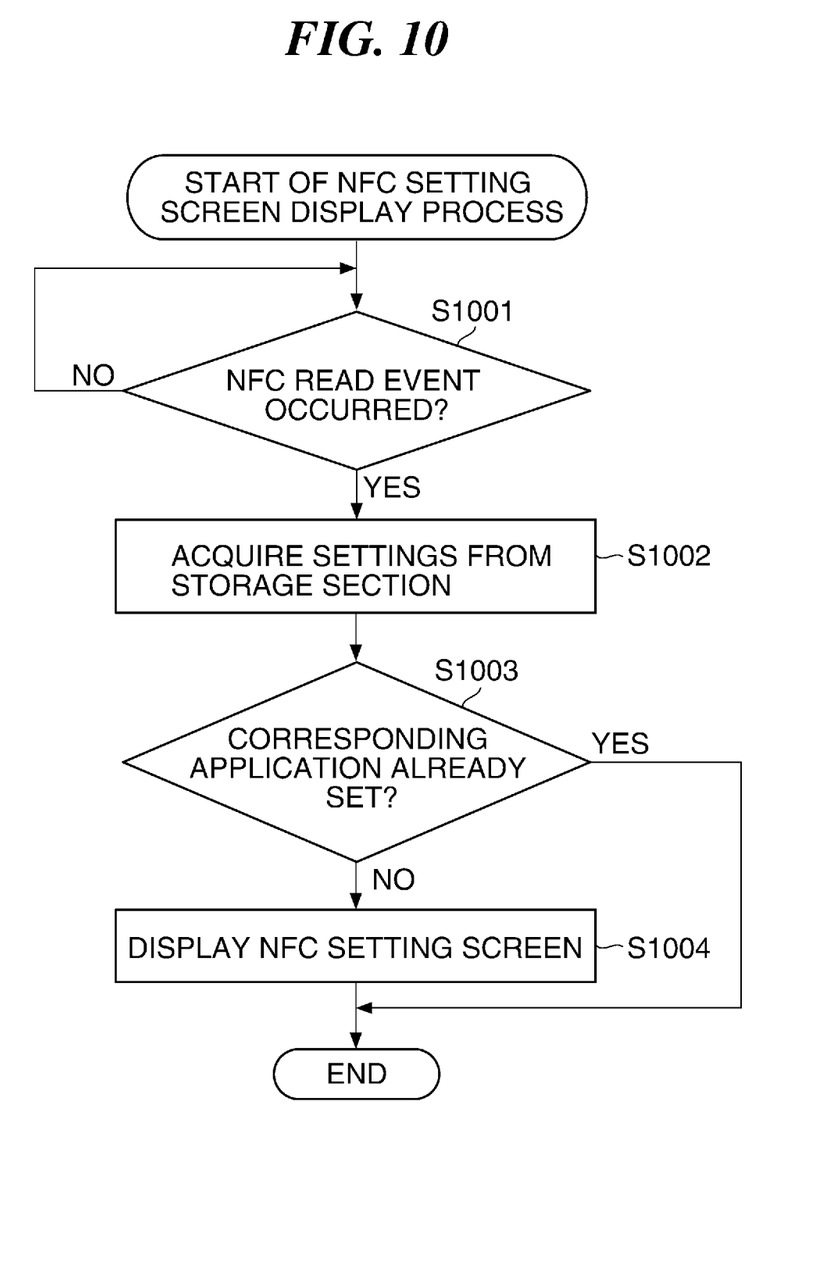
FIG. 10 is a flowchart of an NFC setting screen display process performed by an image forming apparatus according to a second embodiment of the present invention.

FIG. 10 is a flowchart of an NFC setting screen display process which is performed by the image forming apparatus 100 according to the second embodiment.

The NFC setting screen display process shown in FIG. 10 is performed by the NFC controller 203 when the user performs an NFC touch operation using the communication terminal 300 without selecting any application. Further, this process is performed by the CPU 102 executing a program therefor stored in the RAM 103, the ROM 104 or the HDD 105.

The NFC controller 203 determines, based on a notification sent from the NFC unit 109 via the NFC interface 108, whether or not an NFC touch operation has been performed by the communication terminal 300 (step S1001). That is, the NFC controller 203 determines whether or not an NFC read event has occurred.

Here, the NFC unit 109 detects that the NFC reader 307 is located within the NFC communication area of the NFC unit 109, and the NFC unit 109 notifies the NFC touch operation, by generating an interrupt to the controller 101 via the NFC interface 108.

Note that in order to know whether or not a touch operation of the communication terminal 300 has been performed, for example, the NFC controller 203 may perform polling to the NFC unit 109 via the NFC interface 108 and the NFC unit 109 may notify the NFC controller 203 of the NFC touch operation as a response to the polling.

If no NFC read event is detected (NO to the step S1001), the NFC controller 203 is on standby. On the other hand, if the NFC read event occurs (YES to the step S1001), the NFC controller 203 acquires the settings of the application from the storage section 201 (step S1002). Then, the NFC controller 203 refers to the settings of the application, and determines whether or not the application A 406 or the application B 407 has already been selected, i.e. has been set (step S1003).

If the application A 406 or the application B 407 has been set (YES to the step S1003), the NFC controller 203 terminates the NFC setting screen display process. On the other hand, if neither the application A 406 nor the application B 407 has been set (NO to the step S1003), the NFC controller 203 controls the operation controller 200 to display the NFC setting screen 500 on the operation panel 111 (step S1004). Then, the NFC controller 203 terminates the NFC setting screen display process.

As described above, in the second embodiment of the present invention, even in a case where a user has performed the NFC touch operation using the communication terminal 300 without selecting an application on the NFC setting screen 500, the NFC setting screen 500 is automatically displayed again on the operation panel 111.

As a result, it is possible to immediately make the user aware that he/she has to select the application. Further, this eliminates time and effort of the user for performing the manual operation for displaying the NFC setting screen 500 on the operation panel 111, and hence it is possible to make it easy for the user himself/herself to perform the operation.

Next, a description will be given of an image forming apparatus according to a third embodiment of the present invention. The image forming apparatus according to the third embodiment has the same hardware configuration as that of the image forming apparatus according to the first embodiment, and hence the same component elements are designated by the same reference numerals while omitting the description thereof.

There is a case where depending on an installation environment or a usage policy of the image forming apparatus, it is not desirable to allow a general user to perform the operation for selecting an application on the NFC setting screen 500. For example, this is a case where the system administrator desires to limit the operations which can be performed by a general user to some extent, or a case where the system administrator desires to strictly control the usage of the image forming apparatus 100. In the third embodiment, a configuration for coping with such circumstances will be described.

Figure 11:
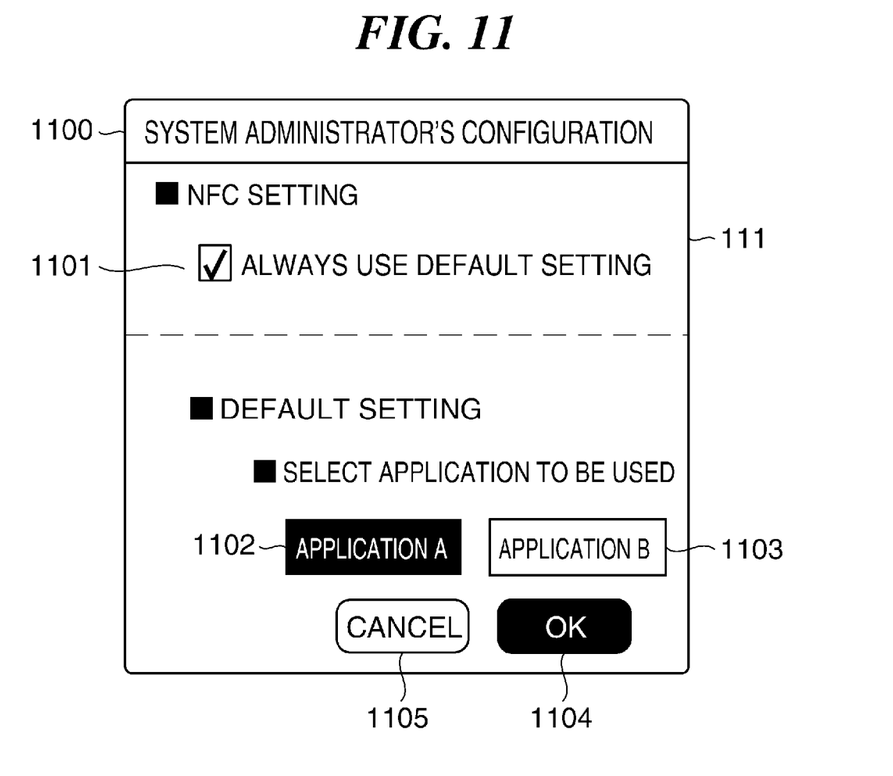
FIG. 11 is a diagram showing an example of a system administrator's configuration screen displayed on the operation panel of an image forming apparatus according to a third embodiment of the present invention.

FIG. 11 is a diagram showing an example of a system administrator's configuration screen 1100, which is displayed on the operation panel 111 of the image forming apparatus 100 according to the third embodiment.

The system administrator's configuration screen 1100 shown in FIG. 11 is an administrator-dedicated screen which can be accessed only by the system administrator, and cannot be accessed by any general user. Entry of a password or the like, set by the system administrator in advance, is required to display the system administrator's configuration screen 1100 on the operation panel 111.

The system administrator's configuration screen 1100 displays an NFC setting menu which is different from the above-described NFC setting screen 500. A check box 1101 for checking whether or not to always use the default setting is displayed on the NFC setting menu on the system administrator's configuration screen 1100.

As the default setting menu, similarly to the NFC setting screen 500, an application A button 1102 and an application B button 1103, and an OK button 1104 and a cancel button 1105 are displayed. The application A button 1102 and the application B button 1103 are made valid and can be selected only in a case where the check box 1101 is checked.

When the check box 1101 is not checked, the application A button 1102 and the application B button 1103 are grayed out and are in an unselectable state.

When the system administrator does not desire to make each general user freely select an application, the system administrator is only required to check the check box 1101 on the system administrator's configuration screen 1100. By this checking, when the system administrator selects the application A button 1102 or the application B button 1103, and presses the OK button 1104, the NFC controller 203 performs the NFC rewriting process, described with reference to FIG. 6. Then, the NFC controller 203 writes the NDEF data based on selection performed by the system administrator into the NFC unit 109.

In this case, selection of the application is disabled on the above-mentioned NFC setting screen 500.

Figure 12:
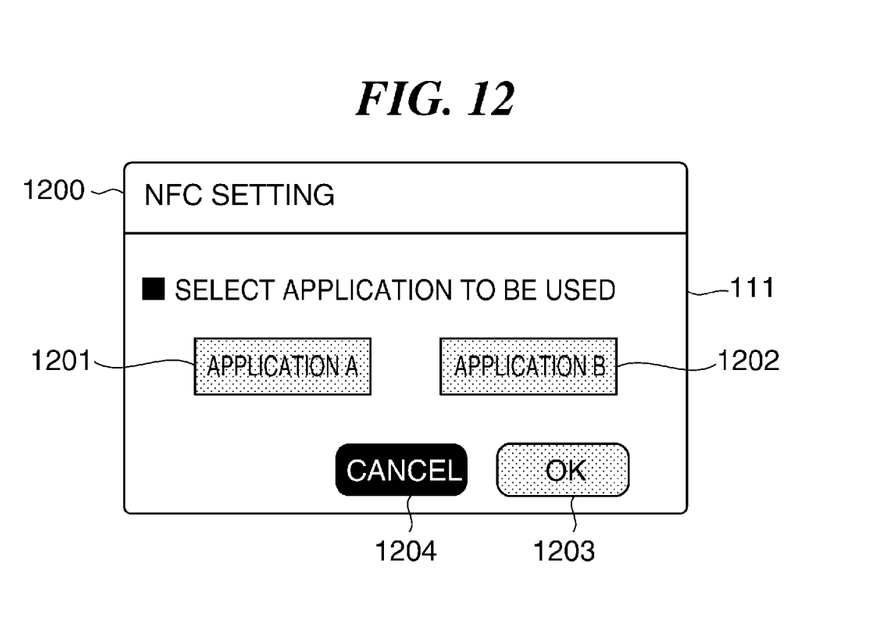
FIG. 12 is a diagram showing an example of the NFC setting screen displayed when an application cannot be selected on the image forming apparatus according to the third embodiment of the present invention.

FIG. 12 is a diagram showing an example of the NFC setting screen displayed when selection of the application is disabled on the image forming apparatus according to the third embodiment.

The illustrated NFC setting screen, denoted by reference numeral 1200, is the same as the above-mentioned NFC setting screen 500, and displays an application A button 1201 and an application B button 1202, and an OK button 1203 and a cancel button 1204.

In this example, it is assumed that the check box 1101 has been checked on the system administrator's configuration screen 1100, and hence the NFC controller 203 displays the application A button 1201, the application B button 1202, and the OK button 1203 e.g. in a grayed-out state to make them unselectable. Therefore, each general user is enabled only to press the cancel button 1204 to terminate the display of the NFC setting screen 1200.

This inhibits each general user from changing the NDEF data to be written in the NFC unit 109. To prevent the NDEF data from being changed, the display may be inhibited from being shifted to the NFC setting screen instead of displaying the buttons in the grayed-out state as on the NFC setting screen 1200 shown in FIG. 12.

If the check box 1101 on the system administrator's configuration screen 1100 is not checked, the NFC controller 203 displays the above-mentioned NFC setting screen 500 on the operation panel 111. This enables each general user to freely update the NDEF data.

If the user presses the cancel button 1105 on the system administrator's configuration screen 1100, the NFC controller 203 controls the operation controller 200 to terminate the display of the system administrator's configuration screen 1100.

As described above, in the third embodiment of the present invention, the system administrator can select whether or not the default setting is to be used. Therefore, when the system administrator selects the default setting, each general user is allowed to use the NFC unit 109 only for a use set by the system administrator.

On the other hand, when the system administrator does not select the default setting, each general user is allowed to use the NFC unit 109 for a desired use, as described in the first embodiment. This makes it possible to introduce a service using the NFC unit according to the installation environment or the usage policy of the image forming apparatus.

As is clear from the above description, in the illustrated example in FIG. 2, the NFC controller 203 and the operation controller 200 function as a selection unit, and the NFC controller 203 functions as a generation unit, a writing unit, and a determination unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2014-168364 filed Aug. 21, 2014, which is hereby incorporated by reference herein in its entirety.

What is claimed is:

1. A communication apparatus comprising:
a near field communication (NFC) unit;
a display unit configured to display a setting screen for setting a desired type of NFC data exchange format (NDEF) data from among a plurality of types of NDEF data written into the NFC unit, wherein the plurality of types of NDEF data include at least an application installed in an external apparatus; and
a controller configured to write, into the NFC unit, the desired type of NDEF data set through the setting screen.

2. The communication apparatus according to claim 1, wherein, in a case where the desired type of NDEF data set through the setting screen includes an application, the controller is configured to write, into the NFC unit, NDEF data including at least a start information for causing the external apparatus reading the NDEF data to start the application and an address of the communication apparatus.

3. The communication apparatus according to claim 1, wherein the NDEF data written into the NFC unit by the controller includes at least an address of the communication apparatus.

4. The communication apparatus according to claim 1, wherein, in a case where the NFC unit detects the external apparatus,
the display unit is configured to display the setting screen.

5. The communication apparatus according to claim 1, wherein the controller is further configured to generate the desired type of NDEF data set through the setting screen, and write the generated NDEF data into the NFC unit.

6. The communication apparatus according to claim 1, wherein communication apparatus comprises a printing apparatus configured to perform printing.

7. A method of controlling a communication apparatus that includes a near field communication (NFC) unit, the method comprising:
displaying a setting screen for a setting a desired type of NFC data exchange format (NDEF) data from among a plurality of types of NDEF data written into the NFC unit, wherein the plurality of types of NDEF data include at least an application installed in an external apparatus; and
writing, into the NFC unit, the desired type of NDEF data set through the setting screen.

8. A non-transitory computer-readable storage medium storing a computer-executable program for executing a method of controlling a communication apparatus that includes a near field communication (NFC) unit, wherein the method comprises:
displaying a setting screen for a setting a desired type of NFC data exchange format (NDEF) data from among a plurality of types of NDEF data written into the NFC unit, wherein the plurality of types of NDEF data include at least an application installed in an external apparatus; and
writing, into the NFC unit, the desired type of NDEF data set through the setting screen.

* * * * *